C. A. P. NORDQUIST.
POULTRY FOUNTAIN.
APPLICATION FILED MAR. 9, 1911.
1,114,638.
Patented Oct. 20, 1914.
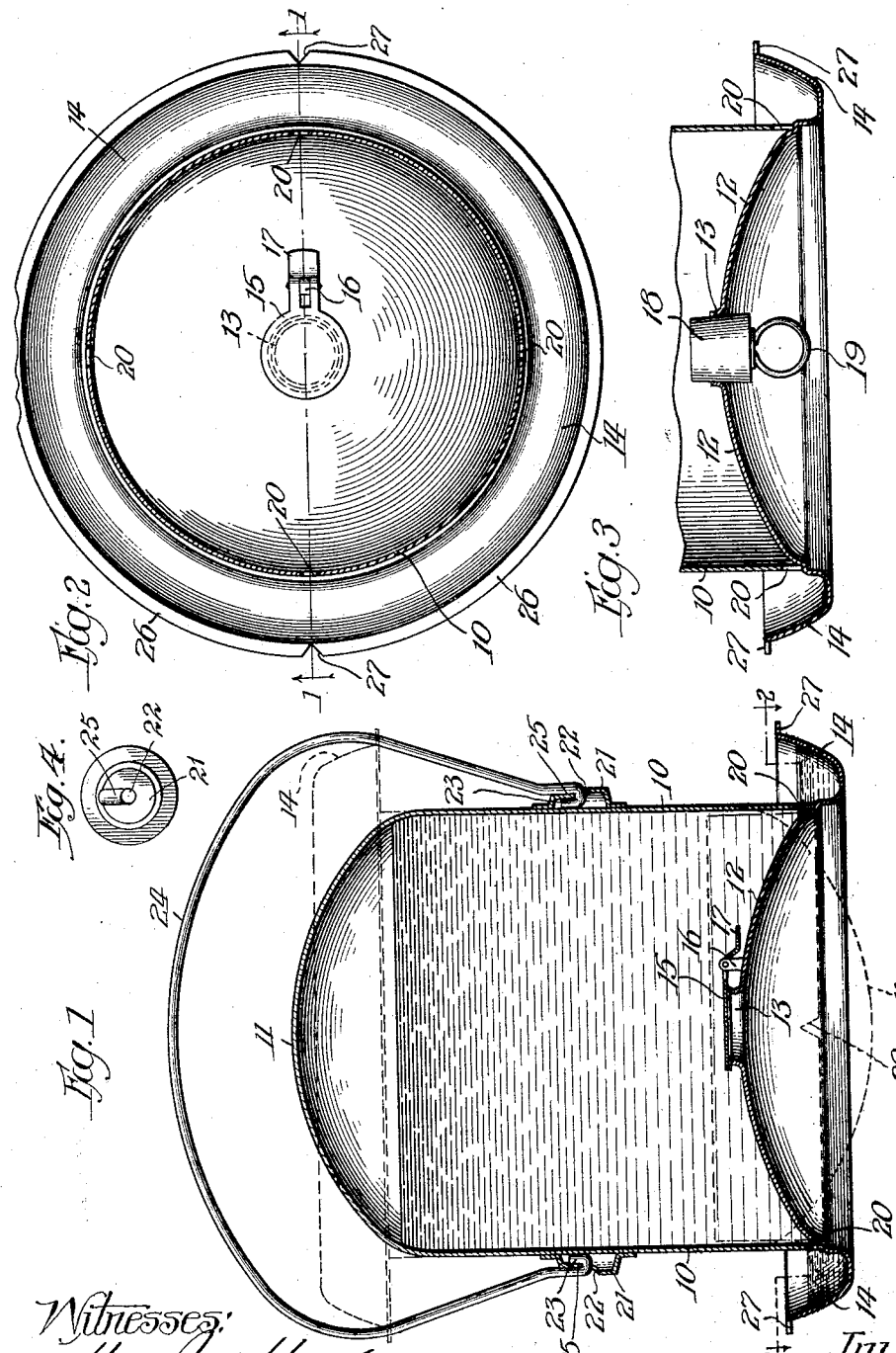

UNITED STATES PATENT OFFICE.

CARL A. P. NORDQUIST, OF CHICAGO, ILLINOIS.

POULTRY-FOUNTAIN.

1,114,638.   Specification of Letters Patent.   Patented Oct. 20, 1914.

Application filed March 9, 1911.   Serial No. 613,449.

*To all whom it may concern:*

Be it known that I, CARL A. P. NORDQUIST, a citizen of the United States, residing at Chicago, in the county of Cook and State of Illinois, have invented certain new and useful Improvements in Poultry-Fountains, of which the following is a specification.

My invention relates to poultry fountains, and refers particularly to portable fountains of simple construction by means of which water is automaticlly supplied to a drinking trough.

I am aware that poultry fountains have been constructed in the past, but they have been open to several serious objections. In the first place, the fountains were made in several parts which were separated when the fountain was supplied with water. The result of this construction was that the parts were very apt to become bent so that they would not properly coöperate, and after separation it of course often happened that one part would become lost, thereby rendering the fountain useless.

In my improved form of fountain the various parts are assembled, and it is unnecesary to remove any of the parts when the reservoir of the fountain is filled. The parts are simple in construction and are readily manufactured, so that while my fountain is very efficient it is at the same time very cheap.

Expressed in general terms, my poultry fountain consists of a reservoir, preferably cylindrical and having a rounded top on which it is impossible for poultry to stand on account of the curved surface thereof. This reservoir is provided with a concave bottom having an aperture in its center, which is preferably closed by an automatic trap. Around the outside of the lower edge of the reservoir is provided a drinking trough, which is supplied with water from the reservoir through suitable holes, the fountain operating on the well-known vacuum principle.

The fountain is supplied with a suitable handle, preferably of wire, which is so constructed that the fountain may be carried either in its normal position with the drinking trough downward, or may be reversed so that the bottom is on top. It is in this position that the reservoir is filled through the aperture in the concave bottom. It will be apparent that on account of the shape of this bottom, when the water reaches the aperture in its center there is still an air-containing space left inside of the reservoir, so that when the same is reversed and placed in its normal position there will be an air space in the top of the reservoir. This is a particular advantage in cold weather, since if the water in the reservoir freezes and expands there is room to allow for such expansion and the fountain is not bursted.

These and other advantages of my improvements will be more readily understood by reference to the accompanying drawings, which represent a preferred embodiment of my invention, and in which—

Figure 1 is a vertical section through my improved poultry fountain, taken on the line 1—1 of Fig. 2; Fig. 2 is a transverse section, taken on the line 2—2 of Fig. 1; and Fig. 3 is a fragmentary vertical section through the bottom of the fountain, with a modified closing means for the aperture in the bottom. Fig. 4 is a side elevation of one of the buttons which hold the ends of the fountain handle.

The poultry fountain comprises a reservoir 10, which is preferably cylindrical and has the convex top 11, this top being sufficiently rounded so as to prevent poultry from obtaining a footing thereon. Soldered, or otherwise suitably attached, to the lower edge of the reservoir 10 is the concave bottom 12, in the center of which is the aperture 13. The outer edge of the bottom 12 is suitably bent to form the drinking trough 14.

A trap 15 pivoted to the bracket 16, and having the extension 17, normally closes the aperture 13. As indicated in Fig. 3, a cork or stopper 18 provided with the ring 19 may readily be inserted in the aperture 13 if the trap 15 is not used or for any reason has become inoperative. Toward the lower edge of the reservoir 10 are the apertures 20, which afford communication between the inside of the reservoir and the drinking trough 14.

Soldered or otherwise suitably attached to opposite sides of the reservoir 10 are the buttons 21 provided with apertures 22 to receive the bent ends 23 of the wire handle 24, each button being depressed in its portion 25, thereby forming a groove in the button, which serves to hold the handle 24 in an upright position when the poultry fountain is in its normal position, as shown in Fig. 1, with the trough 14 resting on the ground.

In the flange 26 of the trough 14 are provided the notches 27, which serve to retain the handle 24 when the fountain is in its reversed position, shown in dotted lines in Fig. 1.

Having thus described the various parts of my invention, the operation of the device may now be readily understood. In order to fill the reservoir 10 the fountain is reversed so that the notches 27 are engaged by the handle 24. The trap 15 is thereby opened until the extension 17 engages the bottom 12. Water is then poured through the aperture 13 until the height of the water reaches said aperture. It will be apparent that an air space remains inside of the reservoir 10 between the plane of the aperture 13 and the edge of the reservoir 10. The fountain may now be turned into the position indicated in full lines in Fig. 1. The trap 15 is automatically closed, and the water covers the bottom 12, the air space occurring between the plane of the aperture 13 and the edge of the reservoir 10 in the reversed position of the reservoir now occupying a position within the top 11 of the reservoir.

Water flows through the apertures 20 into the trough 14 until a sufficient vacuum has been created in the upper part of the reservoir so that the atmospheric pressure exerted on the water within the trough 14 balances the column of water within the reservoir 10. As water becomes exhausted within the trough 14 by evaporation, or on account of being consumed by the poultry, the level of this water gradually falls until it reaches the upper edge of one or more of the apertures 20. When the level of water in trough 14 falls slightly farther air is admitted through such aperture or apertures 20 and passes upwardly in the form of bubbles through the column of water within the reservoir 10 and lowers the vacuum in the upper part of the reservoir. This causes additional water to flow into the trough 14.

In this way the trough 14 is constantly and automatically supplied with water.

In case it is not desired to use the trap 15 or the latter gets out of order, the stopper 18 may be inserted in the aperture 13. When the fountain, in either its normal or reversed position, is being carried by its handle 24, it is apparent that the weight of water in the reservoir will cause the sides of handle 24 to be drawn inwardly toward each other and thus prevent disengagement of the handle from the portions 25 of buttons 21, or the notches 27, as the case may be.

It will be clear to those skilled in the art that many changes can be made in the detailed construction of the various parts which I have described without departing from the spirit or scope of my invention.

What I claim is:

1. In a device of the class described, the combination of a reservoir, a concave base member bent to form a bottom and a trough, said bottom having a filling aperture therein and said reservoir having an aperture communicating with said trough, a gravity operated trap for automatically closing the aperture in said bottom when the fountain is in operative position, and means for limiting the extent to which said trap may open when the fountain is in filling position, substantially as described.

2. In a device of the class described, the combination of a reservoir having integrally formed therewith a bottom and a trough, said bottom having a filling aperture therein, buttons mounted on the sides of said reservoir, and a handle having its ends held by said buttons, said buttons having grooves therein whereby said handle may be retained in upright position when the fountain is in operative position, and said trough having notches therein whereby said handle may be retained when said fountain is turned into its reverse or filling position, substantially as described.

CARL A. P. NORDQUIST.

Witnesses:
ARTHUR M. LEWALD,
HENRY M. HUXLEY.

---

Copies of this patent may be obtained for five cents each, by addressing the "Commissioner of Patents, Washington, D. C."